United States Patent
Nair et al.

(10) Patent No.: US 10,580,059 B2
(45) Date of Patent: Mar. 3, 2020

(54) WEBPAGE WORKFLOWS WITH POOLED TRANSACTIONS

(71) Applicant: PAYPAL, INC., San Jose, CA (US)

(72) Inventors: Rahul Nair, San Jose, CA (US); Eric Byungho Min, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 594 days.

(21) Appl. No.: 14/985,276

(22) Filed: Dec. 30, 2015

(65) Prior Publication Data

US 2017/0193590 A1   Jul. 6, 2017

(51) Int. Cl.
*G06Q 30/00* (2012.01)
*G06Q 30/06* (2012.01)
*G06Q 20/02* (2012.01)

(52) U.S. Cl.
CPC ......... *G06Q 30/0633* (2013.01); *G06Q 20/02* (2013.01); *G06Q 30/0613* (2013.01)

(58) Field of Classification Search
CPC ..... G06Q 30/06; G06Q 30/0601–0643; G06Q 30/08; G06Q 20/00; G06Q 20/080855; G06Q 20/10–1085; G06Q 20/12; G06Q 20/14; G06Q 20/145; G06Q 20/16
See application file for complete search history.

(56) References Cited

U.S. PATENT DOCUMENTS

| | | | |
|---|---|---|---|
| 9,569,419 B1* | 2/2017 | Rice | G06N 5/00 |
| 2002/0128930 A1* | 9/2002 | Nakamoto | G06Q 10/087 705/26.8 |
| 2007/0038566 A1* | 2/2007 | Shestakov | G06Q 20/40 705/44 |
| 2007/0271149 A1* | 11/2007 | Siegel | G06Q 30/0603 705/26.41 |
| 2015/0161598 A1* | 6/2015 | Gale | G06Q 20/108 705/39 |
| 2016/0035007 A1* | 2/2016 | Taylor | G06O 30/0635 705/26.81 |
| 2016/0042437 A1* | 2/2016 | DeWachter | G06Q 30/0633 705/26.8 |
| 2016/0307255 A1* | 10/2016 | Izumo | G06Q 30/0631 |
| 2017/0262930 A1* | 9/2017 | Acharya | G06Q 20/102 |

OTHER PUBLICATIONS

Could the Universal Checkout Cart Completely Change Online Shopping?. Connie Wang Jul. 31, 2013, 10:20 AM (Year: 2013).*

* cited by examiner

*Primary Examiner* — William J Allen
(74) *Attorney, Agent, or Firm* — Haynes and Boone, LLP

(57) ABSTRACT

Methods and systems for webpage workflows with pooled payments are described. A user or a system may define a flow and individual transactions may be added to create a pooled transaction. The pooled transaction may be processed as one transaction. The pooled transaction may also be canceled or returned as one transaction. In certain embodiments, a transaction device and/or customer relationship management system may analyze the pooled transaction and provided suggestions to aid the user.

20 Claims, 11 Drawing Sheets

WEBPAGE WORKFLOWS WITH POOLED TRANSACTIONS

BACKGROUND

The present invention generally relates to pooled transactions, and more particularly to using a platform to enable a user to pool together individual transactions into a single checkout and transaction management system.

Figure 1:
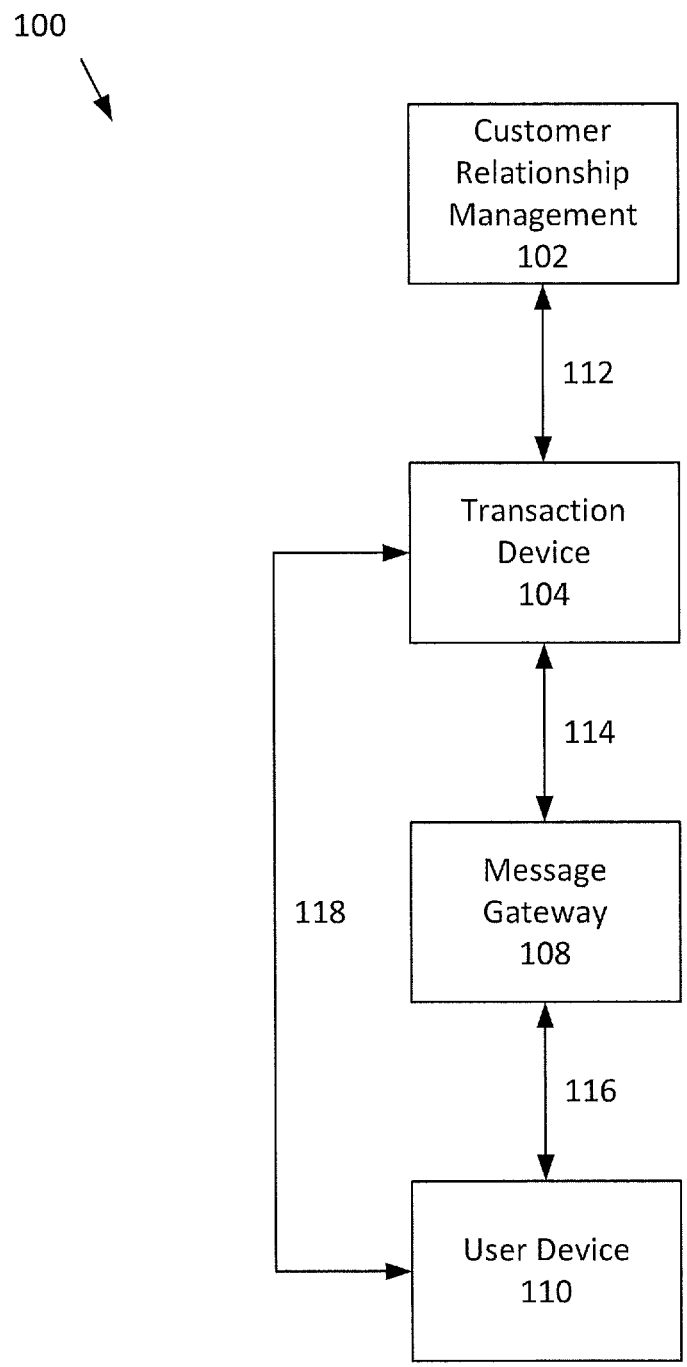
FIG. 1 is a block diagram showing a transaction system according to an embodiment of the disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes systems and methods that facilitate transactions using pooled payment processes. The present disclosure describes some embodiments of a pooled payment transaction system that may include a transaction processing system and a user device and may allow separate transactions to be pooled. Pooled transactions may then be managed collectively, or individually if desired (such as with a return of an individual item that is member of a pool). For example, pooled transactions may be paid for through a single check out process, may be collectively returned, may allow transaction suggestions or discounts to a user, may aid a user in planning or budgeting, or may aid a user in other aspects of a transaction.

Online commerce continues to increase in volume. Indeed, users are increasing use of internet based services to help plan all aspects of their lives. As online commerce increases in popularity, new possibilities and challenges are presented. For example, where historically a user may only shop at one establishment at a time, online shopping allows users to shop at multiple establishments at the same time (e.g., by having multiple web browser windows or tabs open at the same time) or within multiple non-simultaneous shopping sessions. By shopping at multiple establishments and multiple shopping sessions, users may shop for goods or services that may be related in intended use for the user, but not related from the perspective of the providers of those goods or services. Additionally, while certain online payment services may be used to pay for multiple transactions, management of the multiple transaction in conventional systems are still performed individually. Also, online transactions allow targeted advertisements to users. Management of transactions and targeted advertisements are not techniques that may be performed with pen and paper. The present invention may allow users to pool online transactions and checkout and manage transactions collectively. Pooled transactions offer advantages such as ease of management, ease of use, better targeted suggestions and discounts to the user, more powerful transaction flow management, and improved financial management techniques.

The present invention may be performed with certain electronic transaction systems. FIG. 1 is a block diagram showing a transaction system according to an embodiment of the disclosure. While FIG. 1 describes certain components and systems to perform the techniques described herein, it is appreciated that other embodiments may include additional components, may include fewer components, or may include other components.

FIG. 1 shows a transaction system 100 that includes customer relationship management CRM database 102, a transaction device 104, a message gateway 108, and a user device 110. The CRM database 102 may be connected to the transaction device 104 via a communications path 112. The connection may be via communications circuitry (e.g., components that allow communication via Bluetooth, WiFi, NFC, 4G LTE or other data connections, phone and fax enabled communications, as well as other techniques of communications between devices). Accordingly, the CRM database 102, the transaction device 104, the message gateway 108, and/or the user device 110 may each contain communications circuitry to carry out communications and perform the techniques described herein. The transaction device 104 may be connected to the message gateway 108 via a communications path 114. The message gateway 108 may be in communication with the user device 110 via a communications path 116. Additionally, the user device 110 may be in communication with the transaction device 104 via a communications path 118. In certain other embodiments, other components of the transaction system may include additional communications paths allowing other devices to be in communication with each other, such as allowing the CRM database 102 to communicate with the user device 110. Additionally, other embodiments may have fewer communications paths and certain devices may receive communication from one device and transfer it to another.

A user may have, use, or operate the user device 110. The user device 110 may be, for example, a smartphone, a personal data assistant, a tablet, a wearable electronic device (such as a smartwatch or electronically augmented glasses), a laptop, a desktop, or other electronic device, or in some cases a combination of two or more linked devices (e.g., a smartphone and a linked wearable electronic device). The user device 110 may include a user interface that includes a combination of one or more of a display screen, a data entry device such as a keypad or touch screen, buttons, facial or movement recognition abilities, audio recognition abilities, or other items allowing a user to interface with the user device 110. The user may utilize the user device 110 to conduct a transaction.

The message gateway 108 may be, for example, an internet server or gateway that allows for communications via the internet, a SMS gateway that allows for receiving and delivering SMS (text) messages, an e-mail server that allows for sending and receiving e-mail messages, or the sending and receiving of communications through another technique. In certain embodiments, the message gateway 108 may receive information from the user device 110, convert the information into another format suitable for transmission to the transaction device 104, and transmit the converted information to the transaction device 104. The message gateway 108 may also receive, convert, and transmit the converted information in the opposite direction (e.g., from the transaction device 104 to the user device 110). The message gateway 108 may be connected to the user device 110 via the communications link 116. The communications link 116 may be a data connection (e.g., an internet connection such as 3G, 4G, Edge, WiFi, Bluetooth, Near Field Communications, and other data connections), a SMS connection, or another link where information may be transferred between devices.

The transaction device 104 may be a server or a collection of servers and/or other devices that may process transactions and user payments, store user and/or transaction details, cancel transactions and user payments, manage tokens, and generate messages to the user. The transaction device 104 may receive or process data such as, for example, item identifiers or numbers, transaction identifiers or numbers, item or transaction quantity, item or transaction value, account identifiers or account numbers, user information such as name, contact information (e.g., phone numbers, e-mails, social media accounts, messaging service accounts, or other contact information), contact preferences, account information (e.g., bank account information, balance information, credit card numbers, expiration dates, or PIN numbers), account balance, information on the location of the user (such as where the user has been), and other information associated with the account holder, merchant information such as merchant name, address, identifiers, phone numbers, e-mail addresses, merchant account information, and other merchant information. The transaction device 104 may process transactions of the user by, for example, confirming payment associated with the transaction and transferring funds from the user's account to the merchant's account.

The transaction device 104 may be located on a single device (such as a single server or point of sale terminal) or over multiple locations (e.g., located at multiple locations connected by a network such as the internet "cloud"). The transaction device may include one or more non-transitory memories (e.g., one or more magnetic or optical hard drives or solid state drives), and one or more processors communicatively coupled to the non-transitory memory(s). The non-transitory memory may store instructions for operations that may be communicated to the one or more processors for the one or more processors to perform.

As shown in FIG. 1, the transaction device 104 may additionally be in communication with the user device 110 via the communications link 118. The communications link 118 may be, for example, a connection over the internet between the transaction device 104 and the user device 110. The communications link 118 may be a connection over one or more electronic networks.

The CRM database 102 may be a system that may store information or aid in the processing of transactions. The CRM database 102 may perform one or more of the following functions: initiate transactions, process transactions as well as update a status of the transaction, store and/or communicate tokens, and store transaction or historical information associated with the user. The CRM database 102 may, in certain embodiments, be separate from the transaction device 104, but in other embodiments, the CRM database 102 may be integrated with the transaction device 104 (e.g., the non-transitory memory and the processor of the transaction device 104 may include instructions and perform functions described for the CRM database 102). In embodiments where the CRM database 102 is separate from the transaction device 104, the CRM database 102 may be in communication with the transaction device 104 via the communications link 112. The communications link 112 may be any connections link that can transfer data between the CRM database 102 and the transaction device 104.

In some embodiments, the communication between the various components of the system 100 may be direct or indirect communication. Direct communication may be communication where components are directly in contact with each other. Indirect communication may be communication using intermediaries. For example, in some embodiments the merchant 108 may be in communication with one or more servers of the transaction management system 130 via one or more intermediaries such as merchant processors or gateway providers.

Figure 2:
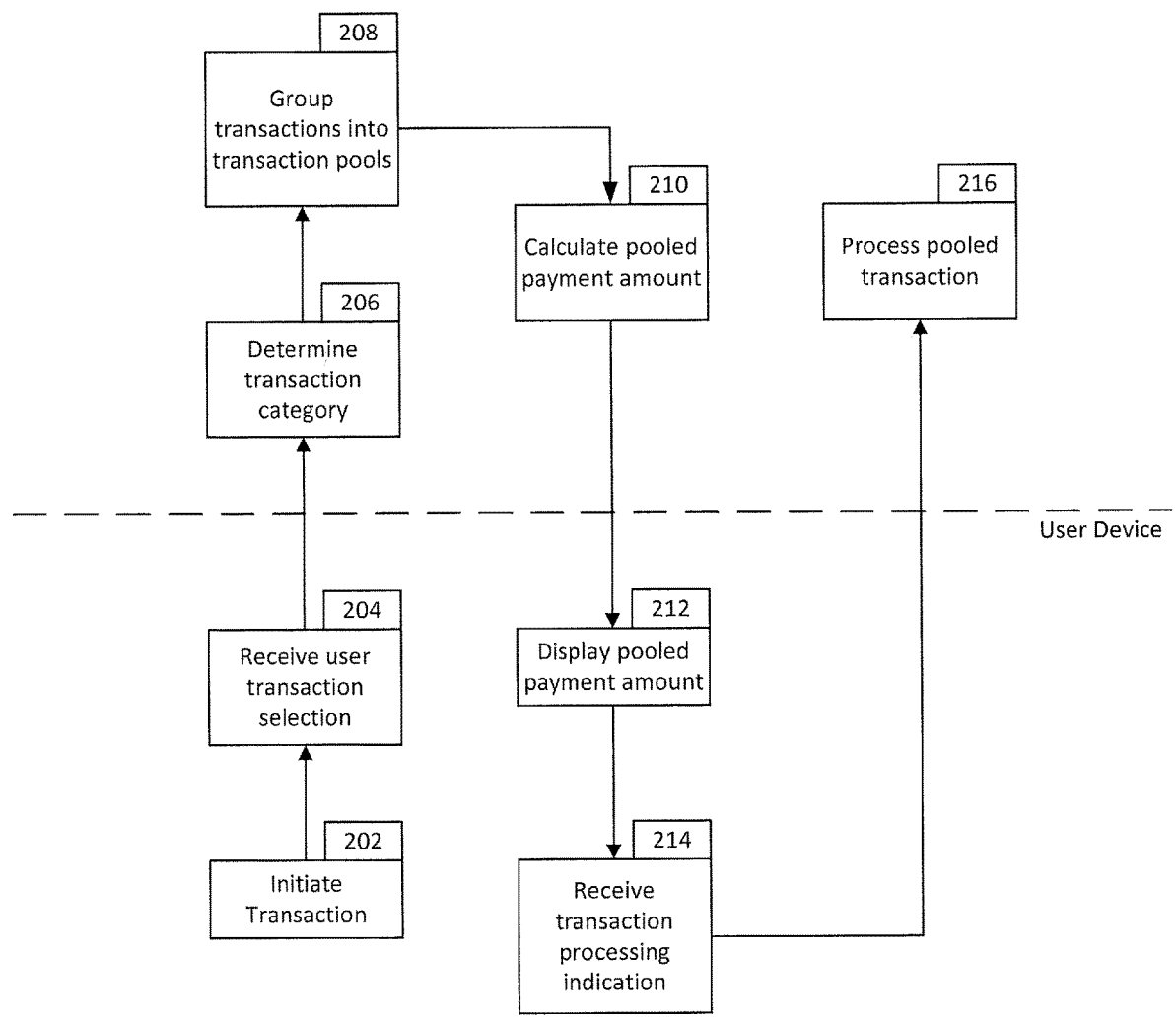
FIG. 2 is a flowchart showing a pooled transaction process according to an embodiment of the disclosure.

FIG. 2 is a flowchart showing a pooled transaction process according to an embodiment of the disclosure. FIG. 2 may illustrate a process of pooling transactions and processing the transactions with a single payment or checkout. FIGS. 2-5 are divided into processes performed by the CRM database and/or transaction device and the user/customer device. The CRM database and/or transaction device may communicate with the user device, and in certain embodiments, the CRM database and/or transaction device may communicate with the user device through a message gateway.

Figure 6:
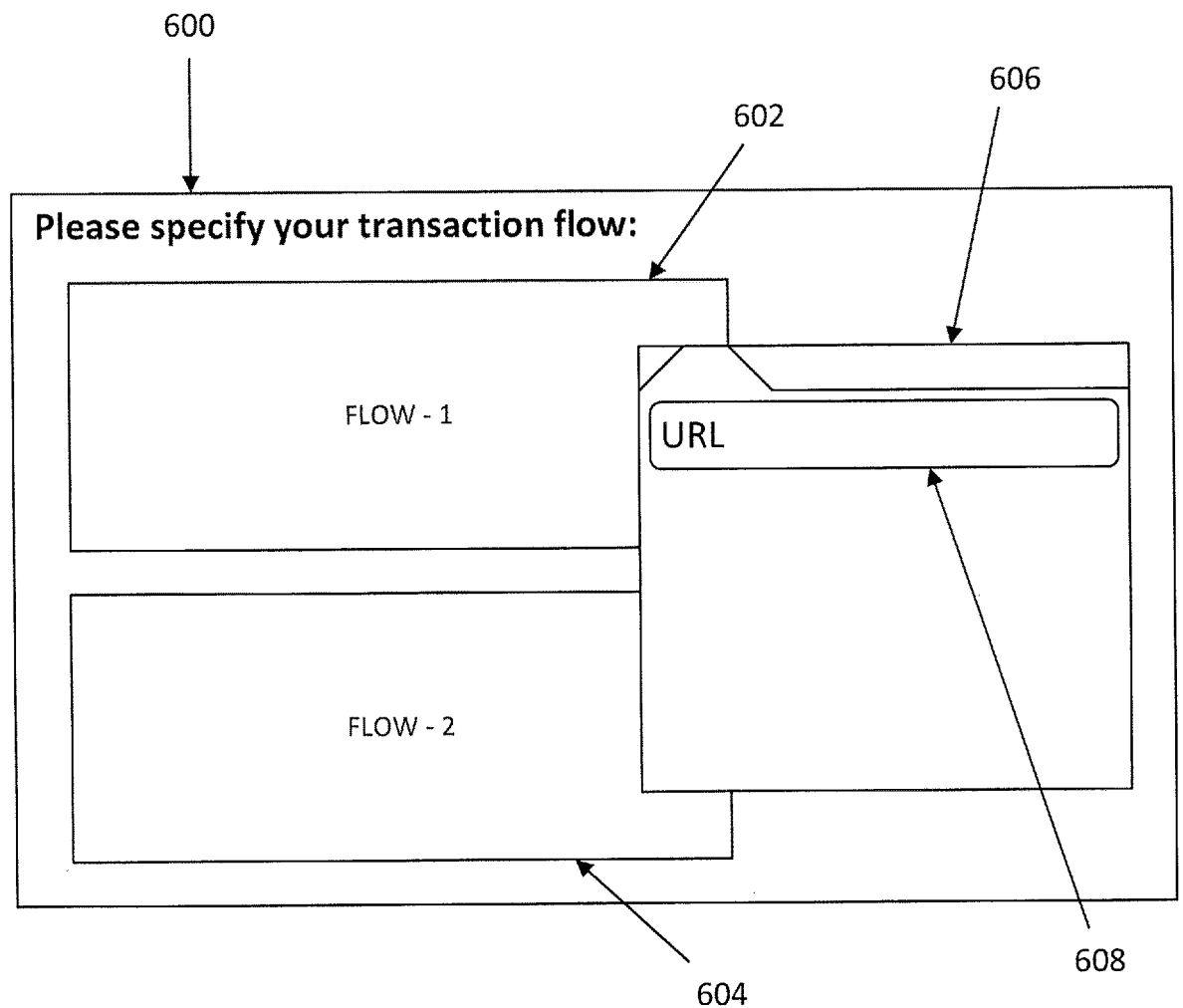
FIG. 6 shows a flow selection user interface according to an embodiment of the disclosure.

In block 202, the transaction may be initiated. The user may initiate the transaction through a user device, such as via a graphical user interface (GUI) of the user device. In certain embodiments, the user may initiate the transaction by selecting one or more items for sale on webpages or apps displayed on the GUI, such as by tapping on or otherwise indicating selection the one or more items. In such embodiments, the user may, for example, add an item to a shopping cart or add the item by clicking on a pool transaction indication (such as a button or other user interface element indicating "Add to Transaction Pool") and the transaction device and/or CRM database may determine transaction categories and other information associated with the individual transaction automatically. In other embodiments, the user may first define a flow (e.g., workflow or transaction flow) that may specify a transaction quantity or define a plurality of transaction categories (e.g., "clothing purchase", "tuition payment", "sending money", "credit card payment", and/or "movie purchase"). Certain embodiments may allow the user to modify the flow at any point of the process. FIG. 6 may further describe initiating a transaction.

In block 204, the user may enter a transaction selection into the user device. The transaction selection may be, for example, a selection by the user to add an item or value transfer (such as a bank transfer or credit card payment) to a transaction pool and/or a shopping cart. In certain embodiments where the user may previously have defined a flow in block 202, the transaction selection may be a selection in a defined transaction category (e.g., a selection by the user for the category of "clothing purchase" may be a transaction adding a piece of clothing to the transaction pool). The transaction selections may then be communicated to the CRM database and/or transaction device. In embodiments where the CRM database and/or transaction device may automatically determine transaction categories and other transaction information from the individual transaction, blocks 202 and 204 may be combined as one process.

After the transaction selection has been communicated in block 204 to the CRM database and/or transaction device, the CRM database and/or transaction device may sort the transaction selection in block 206. The CRM database and/or transaction device may, for example, receive one or more transaction selections in block 204 and group or sort the one or more transaction selections into transaction categories. In certain embodiments there may be only one transaction category, which includes all of the transactions for the flow and thus all the transactions may be included in that transaction category. In other embodiments, there may be multiple transaction categories (e.g., "monthly bills", "tuition expenses", "trip to New York", and other appropriate categories). The CRM database and/or transaction device in those embodiments may divide the transactions into transaction categories by analyzing the transaction. Thus, a plane ticket to New York may be categorized differently than a recurring bill payment. However, a hotel booking for New York may be a same transaction category as that of the plane ticket to New York. However, if the plane ticket to New York is during a first period (e.g., say during March of the present year) and the hotel booking is for a second period (e.g., say during January of next year), the hotel booking and plane tickets may be categorized under different transaction categories based on the differing time periods and the nature of the transactions. When there are multiple transaction categories, each individual transaction may be categorized in one, some, or all of the available categories.

After the transactions have been categorized in block 206, the transactions may then be organized into transaction pools that reflect the transaction categories in block 208. Thus, for example, the "monthly bills", "tuition expenses", and "trip to New York" categories may all be grouped into their own respective transaction pools. Grouping the transaction selections into transaction pools may allow the user to more easily manage the transactions. As such, the user may, for example, pay for all transactions within a transaction pool at the same time or cancel all transactions within the transaction pool at the same time. Additionally, by dividing the individual transactions into transaction pools, the CRM database and/or transaction device may allow for easier management of budgets, delivery addresses, billing information, or other aspects of a transaction. Note that in some embodiments, the user is given the option of confirming, rejecting, or revising the suggested grouping or pooling. This can be beneficial when one or more transactions may seem unrelated, but the user has reasons for pooling the transactions into a single transaction pool.

In certain embodiments, the user may purchase an item conventionally and the transaction may be grouped into a transaction pool or one or more transaction pools may be suggested to the user for grouping. In such an embodiment, the transaction may be grouped into a transaction pool or transaction pool(s) may be suggested according to a category of the transaction, a merchant, a location relating to the purchases, a time period relating to the goods or service purchased, a time of purchase, a transaction amount, a return or refund date deadline, a transaction history (e.g., whether transaction history suggests that the user prefers certain transactions to be grouped into their own transaction pool), or other factors. In certain embodiments where transaction pool(s) may be suggested to the user, the transaction pool(s) may be previously existing transaction pool(s). Other embodiments may suggest to the user new transaction pool(s) to be created, where the transaction pool(s) would include the current purchase as well as other transactions (e.g., transactions initiated prior, concurrent, or subsequent to the current purchase) of the user, based on the factors described herein. Alternatively, a user indication or setting may determine whether new transaction pool(s) and/or currently existing transaction pool(s) may be suggested to the user. For example, the user may prefer that no new transaction pools are suggested.

In certain embodiments, the grouping of transactions may be performed after the transaction has been processed. In such an embodiment, the CRM database and/or transaction device may analyze some or all of the user's transactions and determine whether the transactions may be grouped into a transaction pool or a transaction pool suggested to the user. Such an embodiment would allow transactions conducted over multiple platforms (e.g., multiple websites) at multiple time periods (e.g., not within the same web browsing session) to nonetheless be combined into a single transaction pool. Such an embodiment would allow transaction pools to be generated even if a flow or transaction pool is not first defined, allowing a user the benefits of transaction pools (e.g., combined returns) for those separately processed transactions.

In block 210, the total transaction amount of the transaction pools may be calculated. In certain embodiments, a transaction amount may be calculated for each transaction pools. The total transaction amount for the transaction pools may then be communicated to the customer device and displayed by the customer device in block 212.

The user may provide instructions to process the transaction pool or one or more of the transaction pools in block 214. The user may, for example, click or otherwise select a "confirm payment" button from a device GUI or provide another indication (e.g., clicking another such button, providing a voice command, providing a confirmation to a device connected to the customer device that may then communicate the command to the customer device, or through another technique) to the user device that the user wishes to process the transaction for a transaction pool. In certain embodiments, when there are multiple transaction pools, the user may provide individual indications for processing of each of the transaction pools though other embodiments may allow the user to provide a single transaction processing indication that may process some or all of a plurality of transaction pools.

After the customer device has received a transaction processing indication in block 214, the customer device may transmit information indicating that the user has confirmed that the transaction pool or multiple transaction pools should be processed. The CRM database and/or transaction device may process the transaction pool(s) indicated in block 214. The transaction may be processed by, for example, charging the customer or a customer account (e.g., a customer credit card, bank account, mobile wallet, or other payment account) or communicating transaction detail information (e.g., transaction amounts, billing and shipping addresses, items purchased, and other information) to a bank, credit card, or other financial institution or account associated with the user. After payment has been approved, a confirmation message may be sent to one, some, or all of the merchants, sellers, or selling parties involved in the transaction pool indicating that the transaction has been approved. Additionally, the CRM database and/or transaction device or another party (e.g., financial institution) may then send a confirmation message to the customer device to indicate that the transaction pool has been processed.

The pooled transaction process may allow more convenient checkout for online transactions. Where conventional online transactions allow a customer to shop with multiple establishments at the same time, each such establishment still requires their own separate checkout transaction. The pooled transaction process may allow a customer to pay for multiple transactions (e.g., transactions that are logically linked) and/or modify or cancel multiple transactions at the same time, saving the user time. Additionally, pooling transactions allows a customer to more easily plan out multiple transactions. For example, the pooled payment amount may allow customers to tailor their transactions and possibly change items selected to purchase to, for example, meet a budget or a check out amount. Allowing the customer to tailor their purchases via a pooled transaction allows customers the advantages of, for example, being able to process orders at the same time while traditional shopping would require the customer to communicate between multiple establishments and may, for example, result in an item being unavailable after other items have already been purchased.

Such a situation may be illustrated in the booking of a vacation. Under certain circumstances, such as when a vacation spot is in high demand, there may be limited availability of hotels, flights, restaurant bookings, rentals, and other such bookings. In such situations, each aspect of the booking may affect the other. That is, the customer may desire to book a first flight and thus a corresponding first hotel, but if the first flight is unavailable, the customer may need to book a second flight, but the second flight may require the customer to book a second hotel instead of the first hotel due to availability to conform to the second flight. In such situations, if the customer were to check out the flight and the hotel separately, there may be a possibility that after the customer has booked the first flight, but before the hotel has been booked, the first hotel may be unavailable for booking. However, using transaction pools, the customer may book the flight and hotel at the same time, even if they are through two separate websites, and thus avoid the situation of booking incompatible portions of the vacation.

In an illustrative example, Russell, a banker on Wall St. exhausted from the banking hustle, decides to plan a relaxing vacation to Newfoundland. He creates a flow titled "Newfoundland Trip." Russell books his trip by using an embodiment of a work flow and pooled transaction service provided by PayPal®. In the embodiment used by Russell, an unlimited amount of transactions can be added to the flow, so Russell does not need to define the transaction quantity. (Other embodiments of the flow may require individual transactions to be defined.)

Russell surfs on his phone and adds a round trip flight and a three day stay at a bed and breakfast in Newfoundland to his flow from a single travel website. In addition, he also adds a car rental reservation and tickets to a special motivational speech from two other websites. The round trip flight is $467, the three day stay is a total of $420, the car rental is $188, and the motivational speech is $400. Russell adds each of the items to his transaction pool by clicking on a "Pool this Payment" button shown on each of the websites from where the items were booked. As Russell was planning his trip, he became distracted and purchased a new Rolex watch for $30,000, which he also purchased by clicking a "Pool this Payment" button on the website where the watch was listed. A transaction device processing the transaction pool recognizes that the Rolex purchase is unrelated to the Newfoundland trip. Thus, the transaction device creates one transaction pool for the Newfoundland trip, totaling $1,475, and another transaction pool for the Rolex purchase, totaling $30,000.

On Russell's phone, he is then offered the choice to confi in that the transaction pools should be separated into two different transaction pools, one for the Newfoundland trip and one for the Rolex purchase. Additionally, Russell's phone displays an option to combine the two transaction pools into one pool, or to divide them in further pools. Russell inputs a transaction indication confirming that the transaction pools should be separated into two different transaction pools as suggested by the transaction device and to process the two transaction pools. Russell's phone then sends Russell's transaction processing indication to the transaction device, and both transaction pools are then processed and $31,475 is charged to Russell's black card.

Figure 3:
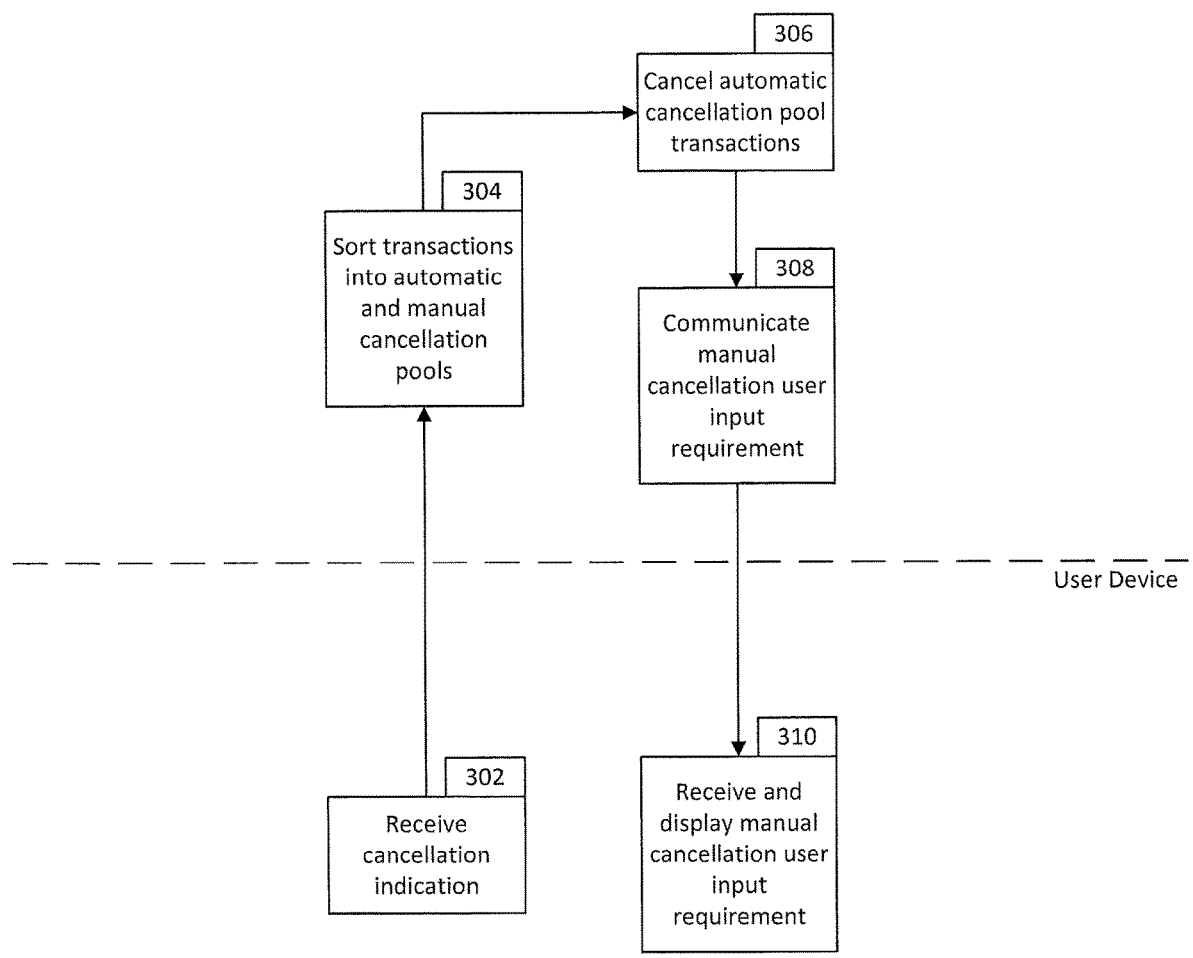
FIG. 3 is a flowchart showing a pooled transaction return process according to an embodiment of the disclosure.

In addition to combining transactions, pooled transactions may allow easier management of transactions. One such example is through a combined pooled transaction return process. FIG. 3 is a flowchart showing a pooled transaction return process according to an embodiment of the disclosure. In FIG. 3, the transactions may have already been processed. In some examples, the payments may also have had items delivered to the customer.

In block 302, the user may provide a cancellation indication to the customer device to cancel a transaction pool. The user may provide the indication by, for example, accessing a record of the transaction pool and clicking a "Cancel Transaction Pool" button or through other tactile, audio, and/or other techniques. Once the cancellation indication has been provided, the indication may be communicated to the CRM database and/or transaction device.

The CRM database and/or transaction device may receive the cancellation indication in block 304 and commence the transaction pool cancellation process. As an optional first step, the transaction device may sort the transactions into manual and automatic cancellation pools. The transaction within the automatic cancellation pool may be transactions that may be canceled with no further action from the customer. The transaction within the manual cancellation pool may be transactions that may require further action from the customer to cancel (e.g., return of merchandise, entry of a confirmation code, speaking with a customer representative, or other actions).

After the transactions are split into automatic and manual cancellation pools, the technique may then proceed to block 306, where all transactions within the automatic transaction pool are canceled. The transactions may be canceled by, for example, sending a transaction cancelation message to the merchant, seller, service provider, or other party or other such indication. Once the merchant, seller, service provider, or other party has received the cancellation message or other indication, the merchant, seller, service provider, or other party may send a refund to the customer and cancel the transaction.

For manual cancellations, the CRM database and/or transaction device may generate a manual cancellation user input requirement message in block 308. Such a message may communicate to the customer what actions are required in order to fully process the transaction cancellation(s) (e.g., return of merchandise, entry of a confirmation code, speaking with a customer representative, or other actions). The manual cancellation user input requirement message may then be communicated to the customer device and displayed or communicated to the customer via the customer device in block 310.

Returning to the example of Russell, we now find him three weeks later, a couple days before his planned vacation. Unfortunately, Russell's boss has had a family emergency and Russell has been required to remain at work during his planned vacation. As such, Russell will be unable to take his vacation and so has to cancel it. In a bad mood, but forced to cancel, Russell loads a website that includes a transaction pool management window. Russell then verbally states to his phone to "cancel trip transaction pool".

Upon receiving the message, Russell's phone communicates to the transaction device to cancel the Newfoundland trip transaction pool. The transaction device determines that Russell's air ticket, bed and breakfast, and rental car bookings can be canceled automatically, but since the motivational speech issued a paper ticket, it requires that Russell return the paper ticket back to the issuer. Thus, the transaction device generates a message indicating that the air ticket, bed and breakfast, and rental car bookings have been canceled, but that Russell needs to return the paper ticket to the issuer to receive a refund for the motivational speech. The message is sent to the customer device. Upon receiving the message, Russell locates the ticket and mails it back. Two weeks later, the ticket having reached the issuer, a refund is issued to Russell.

In another embodiment, the processing of returns or cancellations of related transactions does not need the transactions to have been initially purchased through a specific transaction pool. One or more of the transactions may have been purchased individually through various merchants and websites. When the user wishes to return an item that is related to and dependent on other transactions, the system may determine, based on, for example, transaction history of the user, what other transactions may be related and/or dependent on the transaction being canceled. Once one or more other transactions are identified, the user may be notified, through the user device, whether the user wishes to cancel one or more of the identified transactions. If so, the system may then process the cancellations or returns, as discussed above, without the user having to process each one individually, even though the transactions were not initially pooled when purchased.

Figure 4:
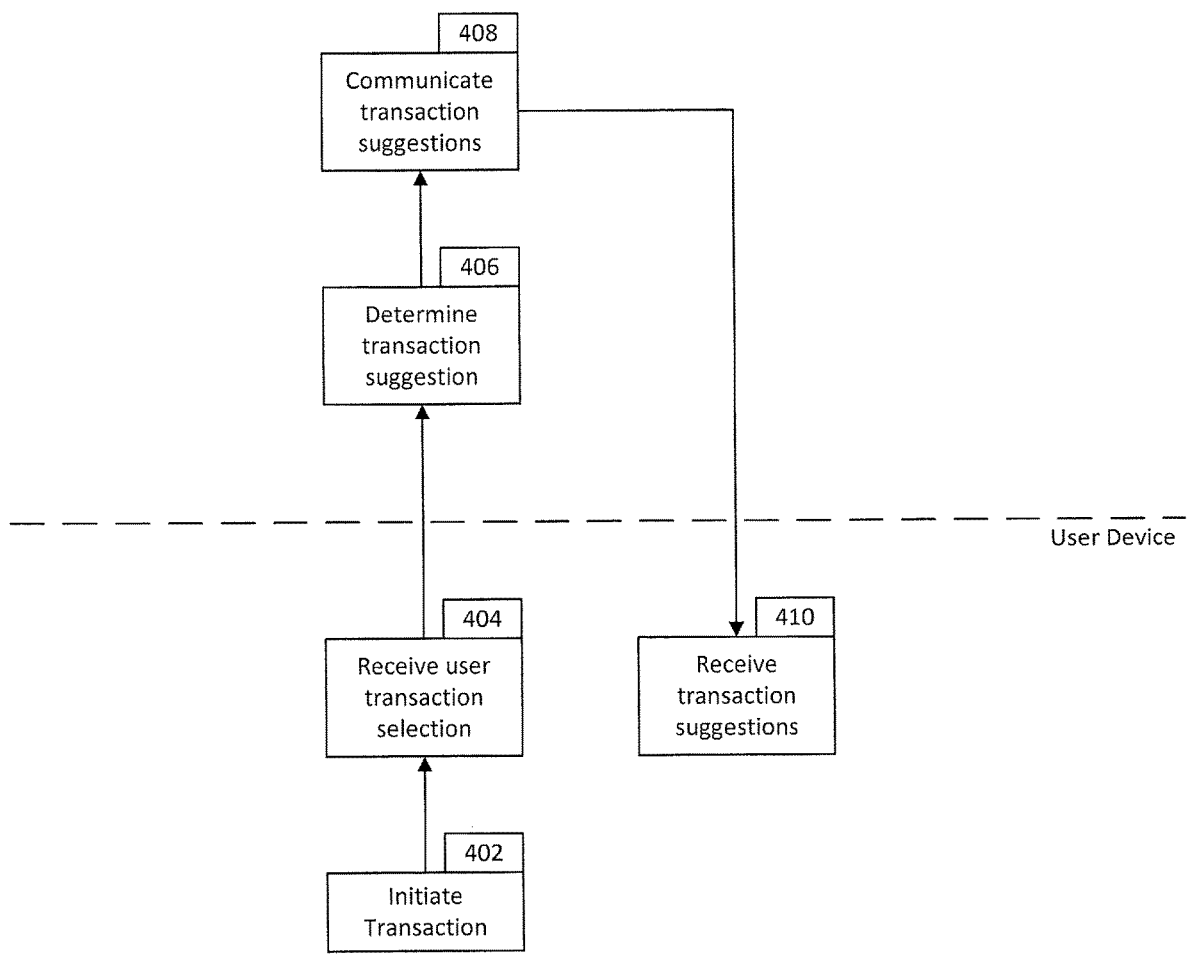
FIG. 4 is a flowchart showing a transaction suggestion determination process according to an embodiment of the disclosure.

In certain embodiments, pooled transactions may also allow better targeted messages at a customer. FIG. 4 is a flowchart showing a transaction suggestion determination process according to an embodiment of the disclosure. The techniques and processes detailed in FIG. 4 may be combined with those disclosed in other figures, such as FIGS. 2, 3, and 5.

In blocks 402 and 404, the transaction may be initiated and one or more user transaction selections (e.g., purchases or transactions) may be made. The transaction may be initiated and the transaction selections made in a manner similar to that detailed in blocks 202 and 204 in FIG. 2.

In block 406, after the CRM database and/or transaction device has received the user transaction selection, a transaction suggestion may be determined. The transaction suggestion may be, for example, a targeted advertisement or information about possible discounts that the customer may qualify for. The transaction suggestion may be determined from, for example, items added to a cart for the current transaction, a transaction history of the user (that may be stored on the CRM database and/or transaction device), a user profile (that may be stored on the CRM database and/or transaction device), or other information. For example, the transaction suggestion may be determined from one or more of a general category of the item being purchased (e.g., housewares), a time of purchase, a time when the item being purchased will be used (e.g., if tickets and hotel bookings are being purchased for a period during March, suggestions may include events in town during March or restaurants around the area of the hotel booking), a location of certain items purchased, a service purchased (e.g., recommending exercise clothing brands to someone purchasing gym membership), a user profile (e.g., a profile indicating that the user plays hockey), a transaction history of the user (e.g., recommending shoes to a user with a history of purchasing shoes), and other techniques of determining the transaction suggestion.

After the transaction suggestion has been determined in block 406, it may be communicated to the customer device in block 408. The customer device may receive the suggestions in block 410 and display or communicate the transaction suggestions to the user.

Returning to the illustrative example, we find Lindsey, who is currently signing up for a fantasy football league. The league requires a one-time registration fee as well as a fee per season. Lindsey adds both to her transaction pool. The transaction device detects that she has joined a league and signed up for a season (e.g., via analyzing linked email, messaging, financial transactions, social media) and thus suggests further fantasy football leagues to her. In addition, the transaction device further sends a notification that the league she has joined has a current discount and offers her an opportunity to redeem the discount to reduce her sign up fees. All of these are displayed by the tablet that she is using to carry out the transaction.

After adding the fantasy football league to her transaction pool, Lindsey further adds a train ticket from New York City to New Jersey. The transaction device then detects that several tickets to a local football game in New Jersey are for sale from resellers and determines that the tickets are appropriate transaction suggestions due to her fantasy football league sign up and train tickets to New Jersey. Additionally, the CRM database and/or transaction device notices from her stored transaction history that Lindsey has recently purchased several Cajun food cookbooks and thus suggests several Cajun restaurants near her New Jersey train stop. Nonetheless, she declines the suggestions.

Figure 5:
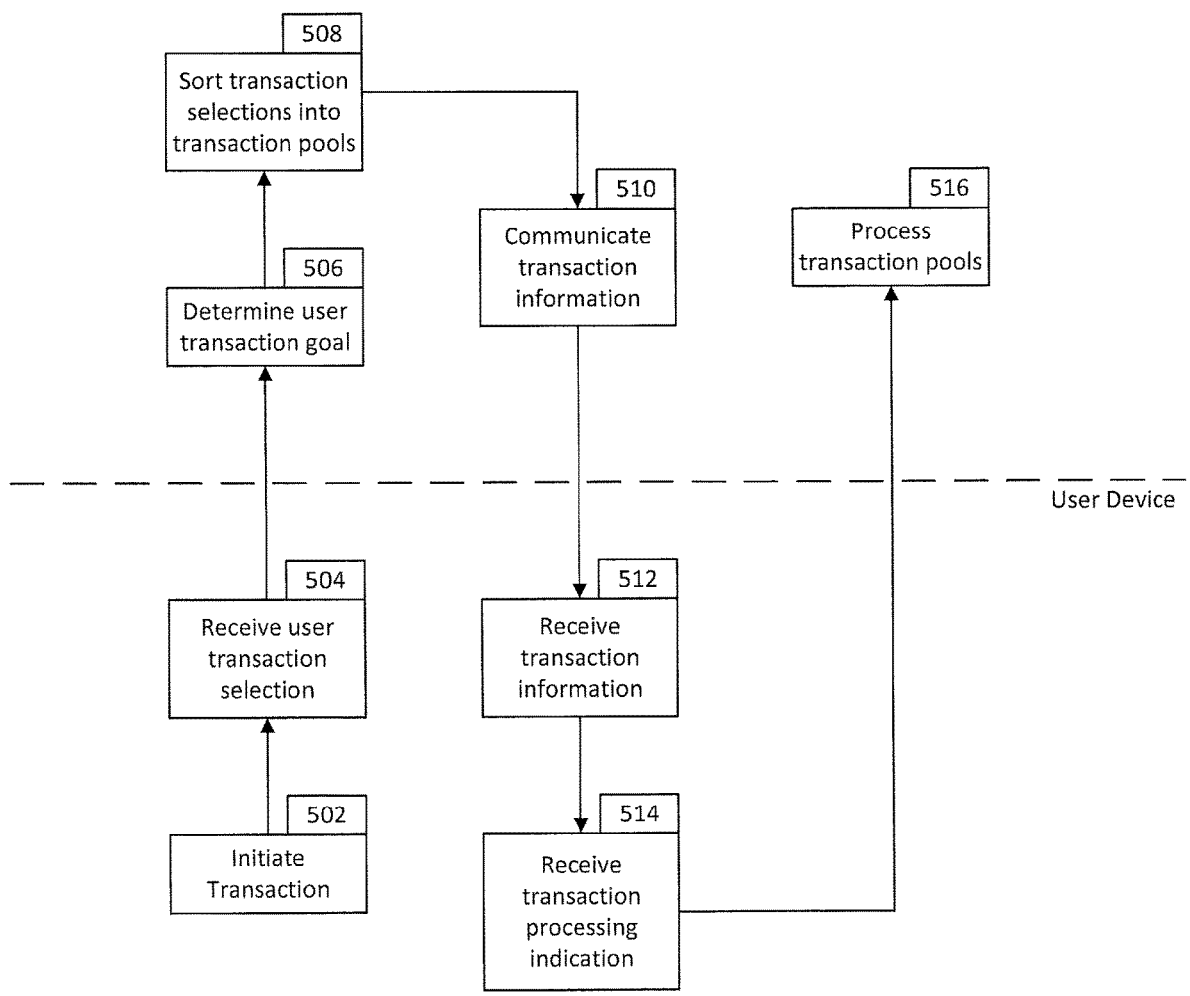
FIG. 5 is a flowchart showing a multiple transaction pool determination process according to an embodiment of the disclosure.

Transaction pools may also be used to help determine and meet user goals. FIG. 5 is a flowchart showing a multiple transaction pool determination process according to an embodiment of the disclosure. The techniques and processes detailed in FIG. 5 may be combined with those disclosed in other figures, such as FIGS. 2, 3, and 4.

In blocks 502 and 504, the transaction may be initiated and one or more user transaction selections (e.g., purchases or transactions) may be made. The transaction may be initiated and the transaction selections made in a manner similar to that detailed in blocks 202 and 204 in FIG. 2.

In block 506, the CRM database and/or transaction device may determine a user transaction goal from the transaction selection. The user transaction goal may be, for example, a monthly budget of the user, a stated goal, an action that the user needs to take (e.g., pay monthly bills), or a goal that the CRM database and/or transaction device determines from the user purchases, transaction history, and/or other user data. Thus, for example, the CRM database and/or transaction device my determine that, since the user is purchasing books on scaling Mt. Everest and booking a plane ticket to Nepal, the user has a goal of being able to scale Mt. Everest.

In optional block 508, the CRM database and/or transaction device may sort the transaction selections of block 504 into multiple transaction pools. The CRM database and/or transaction device may sort the transaction selections into multiple transaction pools according to the transaction goals of block 506. Thus, returning to the example of Russell, if one of the transaction goals determined in block 506 for Russell is to stay within a monthly budget of $40,000, and the CRM database and/or transaction device determines that Russell has already spent $20,000 in the current month, the CRM database and/or transaction device may sort the Rolex watch into a separate transaction pool by itself as the purchase of the Rolex would exceed Russell's monthly budget. The CRM database and/or transaction device may also sort the transaction selections into multiple transaction pools according to other transaction goals (e.g., if the CRM database determines from the user transaction history that the user spends half his time in Los Angeles and half his time in New York City, the CRM database may create two transaction pools, one for transactions where the shipping address is in Los Angeles and one for transactions where the shipping address is in New York City, and sort the individual transactions as belonging to either or both of the transaction pools). In other embodiments, the transaction device and/or CRM database may generate information advising the user of how the transaction pool affects the user's transaction goals (e.g., how a transaction pool affects the user's likelihood of meeting the user's monthly budget goals), but may not divide the transaction pool into multiple pools.

In block 510, the information regarding the user's transaction goals and/or information regarding the transaction pools (e.g., information recommending that the user's transaction pool be divided into multiple pools) may be communicated to the customer device. The customer device may receive and communicate the information to the user in block 512. In block 514, the user may input a transaction processing indication (e.g., an indication of whether to accept or reject the suggested transaction pools). The customer device may receive the transaction indication and communicate the indication to the CRM database and/or transaction device. Upon receiving the indication, the CRM database and/or transaction device may process the transaction according to the transaction indication (e.g., if the user confirms the splitting of a transaction pool into multiple transaction pools, the transaction may be processed with multiple transaction pools where, for example, one transaction pool is processed at one time and the other transaction pool is saved for processing at a later time).

The various techniques described herein may be performed through certain user interfaces, possibly displayed on user or customer devices such as smartphones, tablets, wearable electronic devices, personal data assistants, laptop computers, desktop computers, and other electronic devices. FIG. 6 shows a flow selection user interface according to an embodiment of the disclosure.

The user interface 600 in FIG. 6 includes flow entries 602 and 604 and a web browser 606 with a URL window 608. The user interface 600 may allow a user to determine a flow for a transaction process. In the embodiment shown in FIG. 6, the user may, for example, type in a URL, drag and drop a webpage (from, for example, the web browser 606), copy paste or drag and drop a URL (from, for example, the URL window 608), type in a category (e.g., shoes or tuition payment), or through another technique to determine one or more transaction categories for a flow. In the embodiment shown in FIG. 6, the user may manually define the flow, though other embodiments may automatically define the flow responsive to, for example, the user adding items to a transaction pool (e.g., as the user adds an item to the transaction pool the transaction device and/or CRM database may determine, for example, transaction categories for the item).

Figure 7:
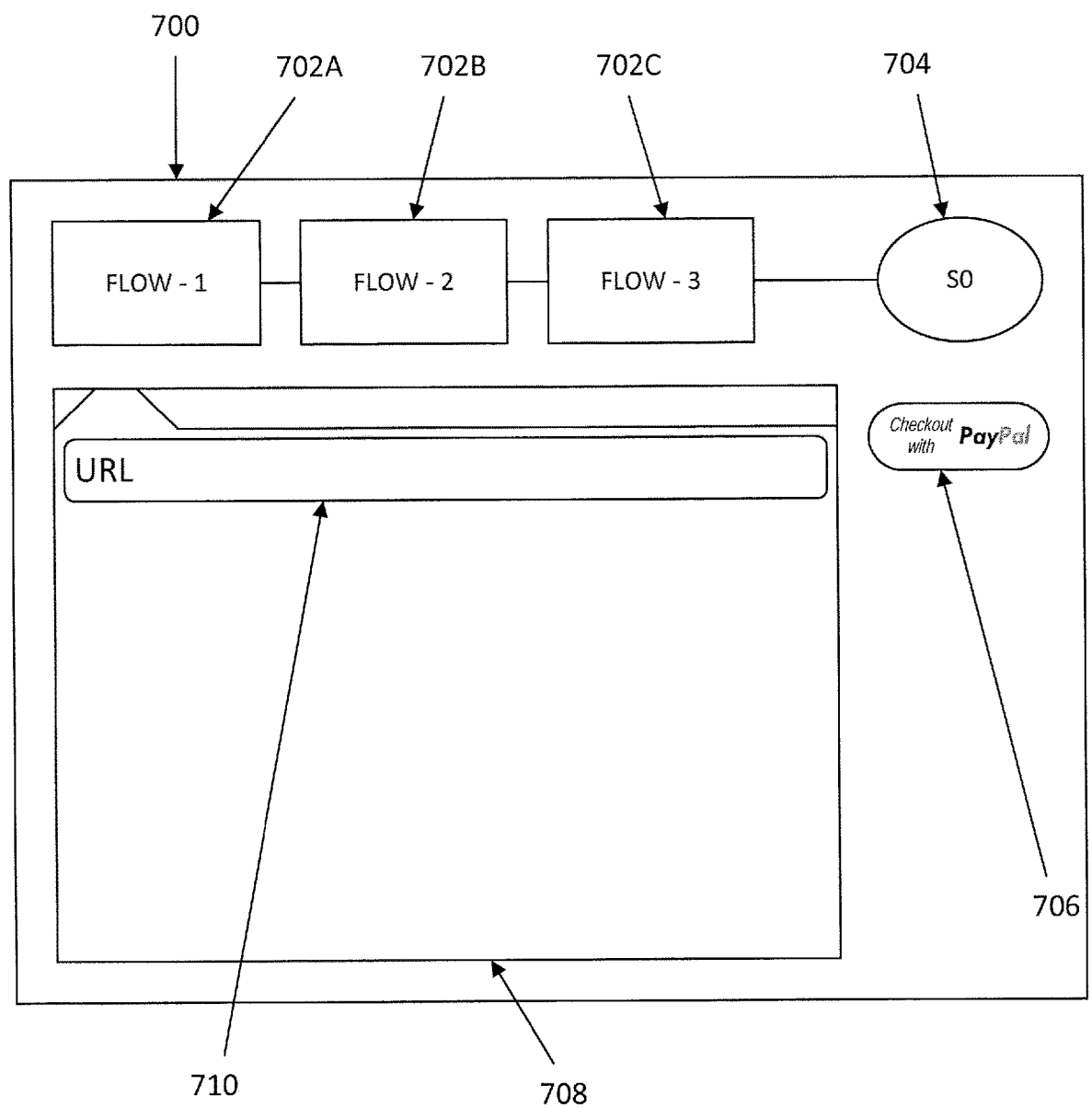
FIG. 7 shows a pooled transaction user interface according to an embodiment of the disclosure.

FIG. 7 shows a pooled transaction user interface according to an embodiment of the disclosure. In the embodiment shown in FIG. 7, the user may have determined the flow in a previous screen, such as the user interface described in FIG. 6. The user interface 700 in FIG. 7 may include flow identifiers 702A-C, a transaction pool total 704, a checkout button 706, and a web browser 708 with a URL window 710.

The flow identifiers 702A-C may, for example, display information associated with an individual transaction such as a transaction amount, item identifier, or other information associated with the individual transaction. Thus, flow identifiers 702A-C may each display a transaction amount associated with the individual transactions. The transaction pool total 704 may display a total pooled transaction amount from the individual transactions (detailed in flow identifiers 702A-C).

The checkout button 706 may be used to checkout a transaction pool. Thus, when the user is satisfied that all individual transactions have been added to the transaction pool, the user may click the checkout button 706 to process the transaction pool. The web browser 708 may allow the user to visit webpages to locate items to add to the transaction pool. The items added to the transaction pool may be accessed via the internet through a URL address, such as a URL address that would be displayed in the URL window 710.

Figure 8A:
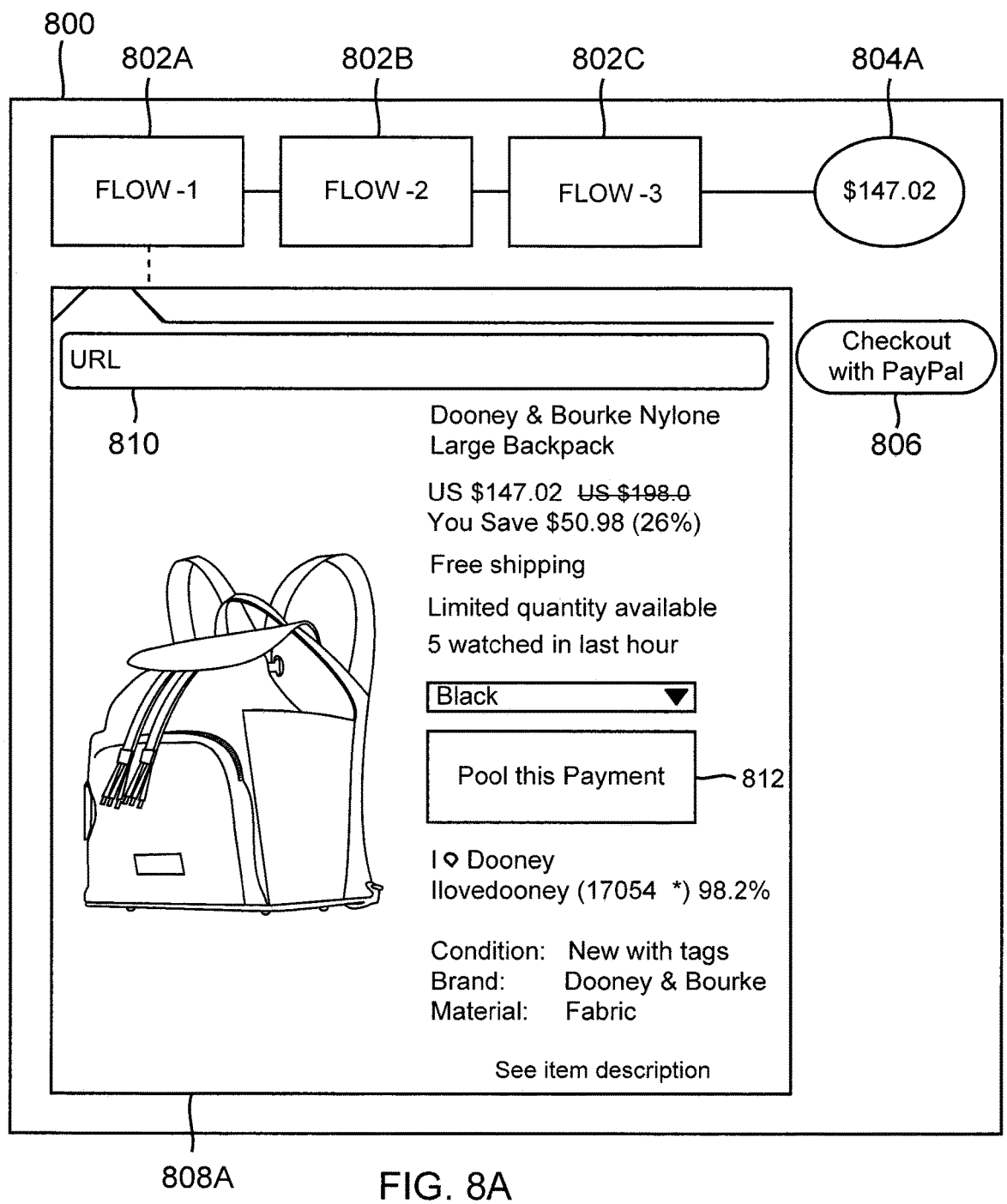
FIG. 8A shows a pooled transaction user interface in a stage of operation according to an embodiment of the disclosure.

FIG. 8A shows a pooled transaction user interface in a stage of operation according to an embodiment of the disclosure. The user interface shown in FIG. 8A may be the user interface of FIG. 7 populated with certain items. For example, the web browser 808A may be similar to the web browser 708 of FIG. 7, but in the web browser 808A, a large backpack item is displayed that a user may be interested in. The web browser 808A may include a button 812 that allows the user to pool the payment. Selecting the button 812 (such as clicking or tapping on the button) may add the item displayed in the web browser 808A to the flow identifier 802A. In the embodiment shown in FIG. 8, the transaction identifier 802A may be associated with a transaction category such as, for example, "handbag", "accessories", or "birthday present". After the item has been added to the transaction pool via selecting the button 812, the total amount of the transaction pool may be displayed in the transaction pool total 804A.

Figure 8B:
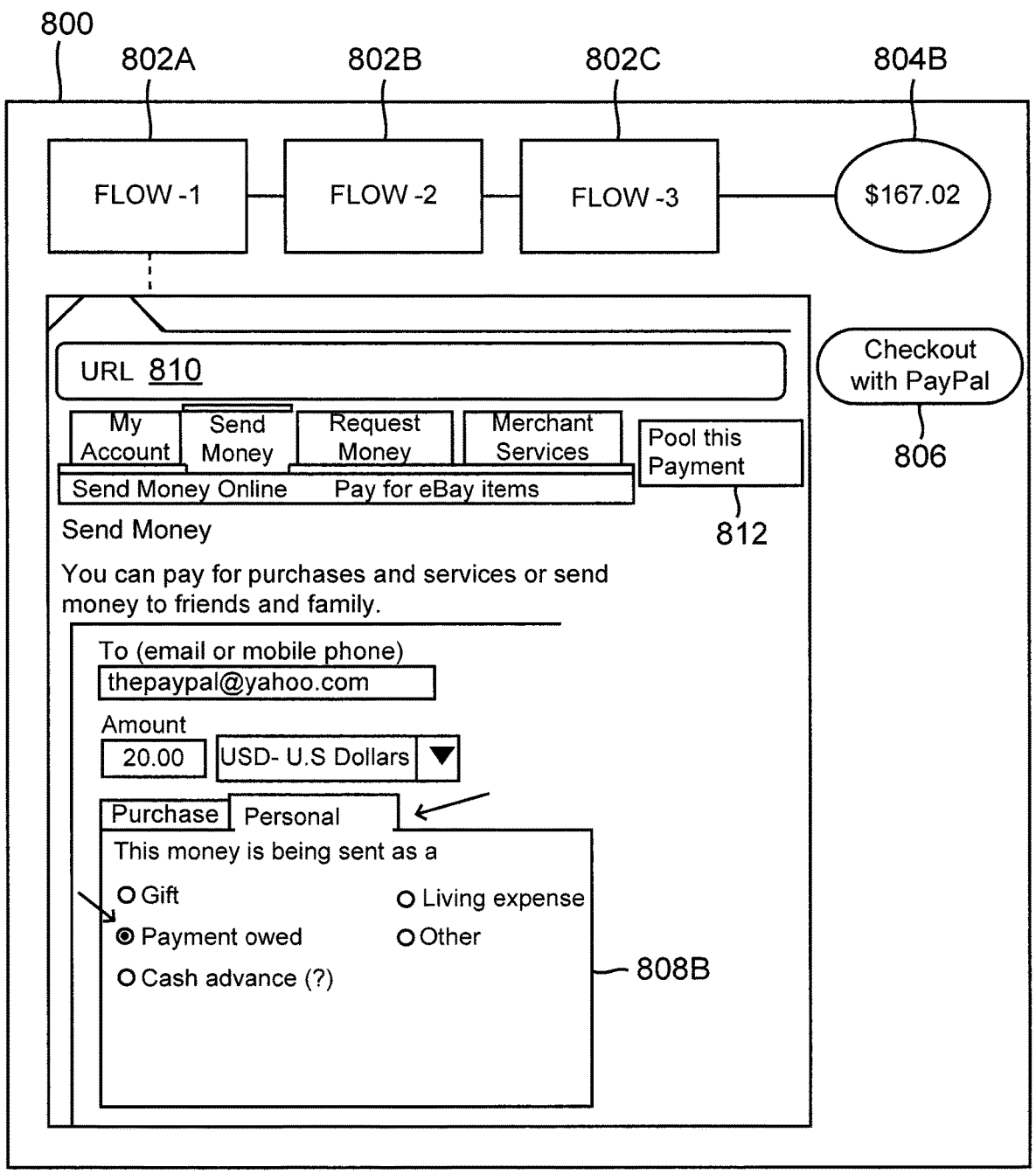
FIG. 8B shows a pooled transaction user interface in another stage of operation according to an embodiment of the disclosure.

FIG. 8B shows a pooled transaction user interface in another stage of operation according to an embodiment of the disclosure. The embodiment shown in FIG. 8B may be a transaction process associated with the embodiment shown in FIG. 8A, although in FIG. 8B, the transaction process may be further along (e.g., may be processing a second individual transaction associated with the process instead of the first individual transaction as shown in FIG. 8A). Thus, the web browser 808B may display a tuition payment using a payment service such as PayPal®. The web browser 808B may accordingly show a payment service webpage with a button 812 that allows the payment made by the service to be pooled. As shown in FIG. 8B, the amount being sent is $20 in value, and clicking on the button 812 in FIG. 8B may allow the transaction pool total 804B to be updated from the $147.02 displayed in FIG. 8A to include the further $20 value and thus be $167.02 as displayed in FIG. 8B.

Figure 9A:
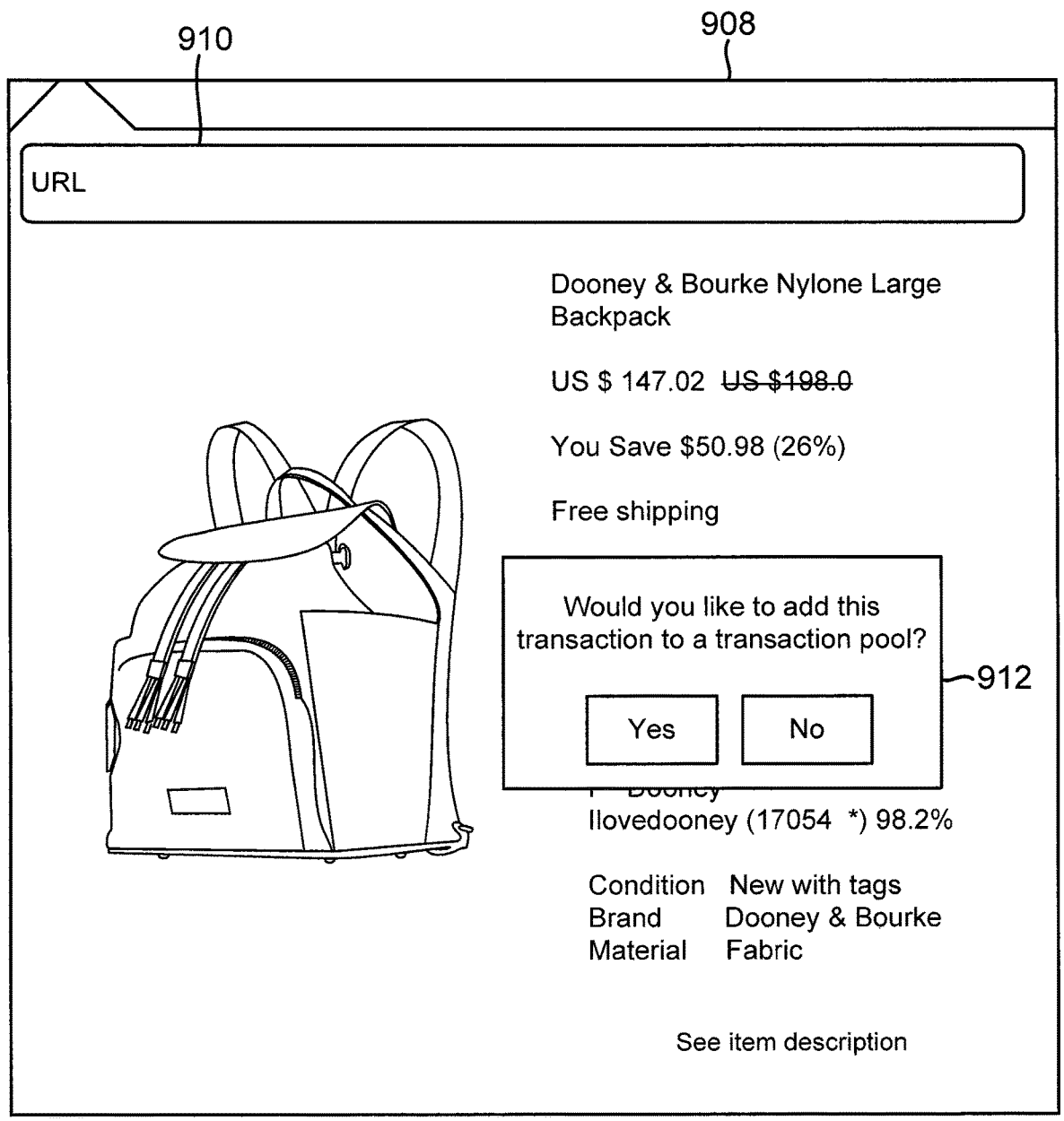
FIG. 9A shows a pooled transaction suggestion user interface in a stage of operation according to an embodiment of the disclosure.

FIG. 9A shows a pooled transaction suggestion user interface in a stage of operation according to an embodiment of the disclosure. FIG. 9A shows a web browser 908 with a URL window 908 and a pool transaction suggestion window 912. Though the user in FIG. 9A may have individually purchased the item shown in FIG. 9A, the pool transaction suggestion window 912 may nonetheless be displayed to the user to determine if the user wishes to pool the purchase into a transaction pool.

Figure 9B:
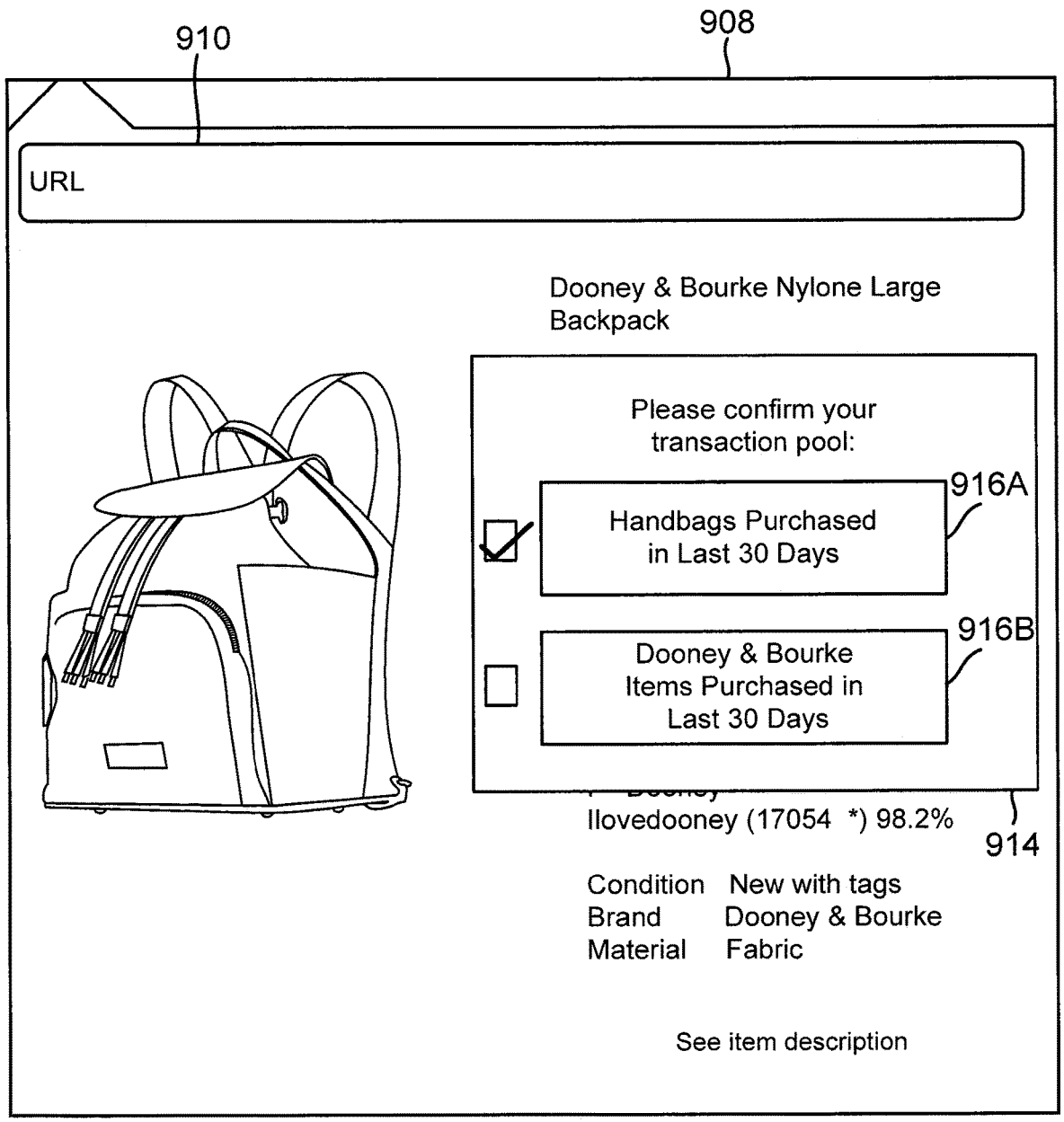
FIG. 9B shows a pooled transaction suggestion user interface in another stage of operation according to an embodiment of the disclosure.

FIG. 9B shows a pooled transaction suggestion user interface in another stage of operation according to an embodiment of the disclosure. FIG. 9B may display a transaction pool selection window 914 after the user has indicated in FIG. 9A that he or she wishes to pool the purchase of FIG. 9A. In the transaction pool selection window 914, a first transaction pool (which includes handbags purchased in the last 30 days) and a second transaction pool (which includes all items from a particular brand that offer handbags and other items purchased in the last 30 days) may be suggested to the user. The user may select one or both of the transaction pools for the current purchase to be included in. Accordingly, a single transaction may be included within multiple transaction pools. In certain other embodiments, the purchase may be automatically included in transaction pool(s) or the user may manually select a transaction pool from all available transaction pools and/or create a new transaction pool for.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A transaction processing system comprising:
a non-transitory memory; and
one or more hardware processors in communication with the non-transitory memory and configured to read instructions from the non-transitory memory to cause the transaction processing system to perform operations comprising:
  receiving, from a user, a plurality of selections to add a plurality of individual transactions to a transaction pool, wherein:
    each individual transaction of the plurality of individual transactions is associated with a respective webpage of a plurality of webpages, and
    each selection of the plurality of selections is received through a pool transaction indicator that is displayed with the respective webpage of the plurality of webpages;
  determining a transaction category for each individual transaction of the transaction pool;
  sorting each individual transaction of the transaction pool into at least one of a plurality of transaction subpools according to the determined transaction category;
  calculating a total pooled payment amount for the transaction pool;
  communicating pool data to a user device, wherein the pool data comprises the plurality of transaction subpools and the total pooled payment amount;
  receiving, from the user device, an indication that a process transaction indicator displayed on the respective webpage of the plurality of webpages was selected by the user; and,
  in response to receiving the indication, initiating processing of the transaction pool as a single checkout process, the processing performed for the respective webpage associated with each individual transaction of the transaction pool.

2. The transaction processing system of claim 1, wherein the operations further comprise:
receiving, from the user device, an indication to cancel the transaction pool.

3. The transaction processing system of claim 2, wherein the operations further comprise:
canceling each individual transaction in response to the indication to cancel the transaction pool.

4. The transaction processing system of claim 2, wherein the operations further comprise:
sorting each individual transaction of the plurality of individual transactions into an automatic cancellation subpool and a manual cancellation subpool;
canceling transactions in the automatic cancellation subpool; and
communicating a user input requirement for the manual cancellation subpool to the user device.

5. The transaction processing system of claim 2, wherein the operations further comprise:
determining a transaction associated with one or more of the plurality of individual transactions of the transaction pool;
creating a transaction cancellation pool comprising the one or more of the plurality of individual transactions of the transaction pool and the associated transaction; and
communicating the transaction cancellation pool to the user device.

6. The transaction processing system of claim 1, wherein the operations further comprise:
    determining one or more transaction suggestions based on at least one or more of the plurality of individual transactions; and
    communicating, to the user device, the one or more transaction suggestions.

7. The transaction processing system of claim 6, wherein the one or more transaction suggestions are determined based on, at least in part, the determined transaction category of one or more of the plurality of individual transactions or a transaction location associated with one or more of the plurality of individual transactions.

8. The transaction processing system of claim 6, wherein the operations further comprise:
    storing a transaction history associated with the user or the user device; and
    determining the one or more transaction suggestions based on, at least in part, the transaction history.

9. The transaction processing system of claim 6, wherein the one or more transaction suggestions are determined based on, at least in part, a transaction timeframe associated with one or more of the plurality of individual transactions.

10. The transaction processing system of claim 1, wherein the operations further comprise:
    storing a transaction history associated with the user or the user device; and
    determining one or more suggested transaction pools based on the transaction history and at least one of the plurality of individual transactions.

11. The transaction processing system of claim 1, wherein the operations further comprise:
    receiving a user indication of a transaction subpool of the plurality of transaction subpools for at least one of the plurality of individual transactions.

12. The transaction processing system of claim 1, wherein the operations further comprise:
    determining one or more transaction discounts based on one or more of the plurality of individual transactions; and
    communicating, to the user device, the one or more transaction discounts.

13. The transaction processing system of claim 1, wherein the operations further comprise:
    determining a transaction goal associated with the user or the user device;
    comparing the transaction goal to the total pooled payment amount; and
    communicating data associated with the comparison of the transaction goal to the total pooled payment amount to the user device.

14. The transaction processing system of claim 13, wherein the sorting of each individual transaction of the transaction pool into at least one of the plurality of transaction subpools comprises:
    sorting, based on the comparison, the plurality of individual transactions of the transaction pool into at least a first transaction subpool and a second transaction subpool, wherein each of the first transaction subpool and the second transaction subpool is associated with different timeframes and communicating the data associated with the comparison comprises communicating data associated with the first transaction subpool and the second transaction subpool.

15. The transaction processing system of claim 14, wherein the operations further comprise:
    processing the first transaction subpool during a first timeframe based on the indication; and
    processing the second transaction subpool during a second timeframe.

16. A method comprising:
    receiving, by at least one processor from a user, a plurality of selections to add a plurality of individual transactions to a transaction pool, wherein:
        each individual transaction of the plurality of individual transactions is associated with a respective webpage of a plurality of webpages; and,
        each selection of the plurality of selections is received through a pool transaction indicator that is displayed with the respective webpage of the plurality of webpages;
    determining, by at least one processor, a transaction category for each individual transaction of the transaction pool;
    sorting, by at least one processor, each individual transaction of the transaction pool into at least one of a plurality of transaction subpools according to the determined transaction category;
    calculating, by at least one processor a total pooled payment amount for the transaction pool;
    communicating, by at least one processor, pool data to a user device, wherein the pool data comprises the plurality of transaction subpools and the total pooled payment amount;
    receiving, by at least one processor from the user device, an indication that a process transaction indicator displayed on the respective webpage of the plurality of webpages was selected by the user; and
    in response to receiving the indication, initiating, by at least one processor, processing of the transaction pool as a single checkout process, the processing performed for the respective webpage associated with each individual transaction of the transaction pool.

17. The method of claim 16, further comprising:
    receiving, from the user device, an indication to cancel the transaction pool;
    sorting each individual transaction of the plurality of individual transactions into an automatic cancellation subpool and a manual cancellation subpool;
    canceling transactions in the automatic cancellation subpool; and
    communicating a user input requirement for the manual cancellation subpool to the user device.

18. A non-transitory machine-readable medium having stored thereon machine-readable instructions executable to cause a machine to perform operations comprising:
    receiving, from a user, a plurality of selections to add a plurality of individual transactions to a transaction pool, wherein:
        each individual transaction of the plurality of individual transactions is associated with a respective webpage of a plurality of webpages; and,
        each selection of the plurality of selections is received through a pool transaction indicator that is displayed with the respective webpage of the plurality of webpages;
    determining a transaction category for each individual transaction of the transaction pool;
    sorting each individual transaction of the transaction pool into at least one of a plurality of transaction subpools according to the determined transaction category;
    calculating a total pooled payment amount for the transaction pool;

communicating pool data to a user device, wherein the pool data comprises the plurality of transaction subpools and the total pooled payment amount;

receiving, from the user device, an indication that a process transaction indicator displayed on the respective webpage of the plurality of webpages was selected by the user; and, in response to receiving the indication, initiating processing of the transaction pool as a single checkout process, the processing performed for the respective webpage associated with each individual transaction of the transaction pool.

19. The non-transitory machine-readable medium of claim 18, wherein the operations further comprise:

receiving, from the user device, an indication to cancel the transaction pool;

sorting each individual transaction of the plurality of individual transactions into an automatic cancellation subpool and a manual cancellation subpool;

canceling transactions in the automatic cancellation subpool; and communicating a user input requirement for the manual cancellation subpool to the user device.

20. The non-transitory machine-readable medium of claim 18, wherein the operations further comprise:

determining a related transaction associated with one or more of the plurality of individual transactions of the transaction pool;

creating a transaction cancellation pool comprising the one or more of the plurality of individual transactions of the transaction pool and the related transaction; and communicating the transaction cancellation pool to the user device.

* * * * *